Patented Mar. 21, 1944

2,344,708

UNITED STATES PATENT OFFICE 2,344,708

PROTECTIVE COATING COMPOSITION

Edward A. Lasher, Los Angeles, Calif., assignor to California Flaxseed Products Company, Los Angeles, Calif., a corporation of California No Drawing. Application March 31, 1942, Serial No. 437,024

20 Claims. (Cl. 106—171)

This invention relates to surface coating compositions containing cellulose esters and ethers.

The object of my invention in general is to provide cellulose lacquer films having improved flexibility, softness and pliability, which improvement remains permanent over long periods of time.

My composition consists of cellulose ether or ester, and an acid ester resin of hydroxylated oil, with the usual diluents, solvents and pigments.

The cellulose derivatives may be any of the well known cellulose compounds having lacquer making qualities such as cellulose acetate or nitrate, or methyl or ethyl cellulose, and the proportion of cellulose ingredient may be varied to give the desired consistency and hardness to the dried film. The pigment may be of the well known types used in cellulose lacquers. The solvents and diluents may be selected for the particular cellulose derivative used in the composition. I prefer to use ethyl acetate for cellulose nitrate and ethyl cellulose.

The acid resins of my compositions are partial esters of certain glycerides with aliphatic acids. A series of such resins may be prepared as described below, the individual esters having varying properties ranging from low to high viscosities, of varying insolubility in mixed hydrocarbon solvents such as aviation gasoline (containing aromatic hydrocarbons), and of varying degrees of stability to subsequent exposure and heating; and having the property of imparting softness and pliability to the films produced by the evaporation of the solvents of the coating compositions.

The acid resins of my composition consist of partially esterified compounds formed from hydroxylated oils such as raw and blown castor oils, blown linseed oil and the like, reacted with hydroxy polybasic aliphatic acids such as citric acid, under conditions such that only partial esterification takes place, and the product has a high acid number, that is, a high content of unreacted carboxyl groups.

The term "hydroxylated oils" includes the natural oils which have free hydroxyl groups, for example raw castor oil, and also those oils which have been obtained by "blowing" certain oils having unsaturated carbon bonds, for example castor oil, linseed oil, rape oil, sardine oil, etc., or which are otherwise treated to increase their original hydroxyl content. It is well known that "blowing" causes an increase in the hydroxyl content over that of the original oil, as evidenced and usually measured by the increase in the "acetyl number." Blowing also produces a marked increase in the viscosity of the oils, and viscosity increase is an approximate measure of the amount of blowing and hence of the hydroxyl group content.

I prefer to use blown castor oil in producing the acid ester resins because of its availability, high viscosity, and reactiveness in the esterification reaction, but raw castor oil, blown linseed oil, and other equivalent hydroxylated oils may be used.

Illustrative of the method of making my acid esters, 20 parts by weight of blown castor oil (Saybolt 210° viscosity, 285) were heated with 11 parts of citric acid to about 400° F., raising the temperature gradually over a period of one and one-half hours and holding at the maximum temperature for a few minutes. A viscous resinous product was produced. This resin is strongly elastic and tacky, non-hygroscopic and non-drying. It is not dissolved nor swelled appreciably by aliphatic or aromatic hydrocarbons. When used to the extent of about 20 percent in a cellulose nitrate lacquer composition, it improves the working properties of the liquid, and adds flexibility and softness to the lacquer film. In addition, it greatly improves the resistance of the film to aromatic and aliphatic hydrocarbon solvents, such as those contained in aviation grades of gasoline.

The term "polybasic" acid as used in these specifications and claims is meant to include those acids having two or more active carboxyl groups; and the term "hydroxy" is used to include one or more active hydroxyl groups.

By replacing part of the hydroxy polybasic acid with a hydroxy monobasic aliphatic acid such as lactic acid, the ester resin has improved stability, and the product, under the same conditions of reacting, is softer than where the hydroxy polybasic acid alone is used. For example, 120 parts by weight of blown castor oil (Saybolt 210° viscosity, 285), 72 parts of citric acid, and 45 parts of lactic acid (85 percent) were mixed and heated to 280° F. during the first hour; from 280 to 320° F. in the second hour; 320 to 360° F. in the third hour; and held at 360 F. for approximately one half hour, or unitl the acid number was about 230. The resin product is of heavy consistency, is non-drying, non-hygrosopic, permanently soft, strongly tacky, and is not appreciably soluble in any type gasoline, including "high octane" aviation gasoline with aromatic hydrocarbon content. The proportions of citric acid and lactic acid may be varied to give desired qualities in the resin product.

Illustrative of lacquer type surface coating compositions which may be made using the acid ester resin above described (the partial esterification product of blown castor oil, citric acid, and lactic acid) are the following compositions:

Example I

| | Parts by weight |
|---|---|
| Acid ester resin | 34 |
| Cellulose nitrate (30% ethanol) | 14 |
| Ethyl acetate | 103 |
| Pigment | 2 |

After thorough mixing to a uniform product, a film of this composition when poured on a glass plate, dried to a hard but non-brittle, non-tacky film, in about eight minutes.

Example II

| | | |
|---|---|---|
| Acid ester resin | parts by weight | 189 |
| Ethyl cellulose ("Ethocel-100") | do | 21 |
| Ethyl acetate | do | 335 |
| Semi-aromatic solvent (Asso. 19/27) | | 213 |
| Pigment | parts by weight | 10 |

A film from this composition poured on a glass plate dried in about fifteen minutes, giving a tough, elastic, non-tacky coating, highly resistant to the solvent action of aviation gasoline.

The above described acid ester (castor oil, citric acid and lactic acid), itself quite insoluble in aromatic and aliphatic hydrocarbons, imparts this property to lacquer type compositions, and serves also as a plasticizer and softener, giving lacquer films of superior elasticity. The resin also improves the adhesion of lacquers to metals. When the pigment material consists of zinc chromate, the lacquer does not cause corrosion of metal surfaces. Either of the above compositions I and II may be used satisfactorily for "slushing" compounds for coating the inside of tanks for aviation gasoline by the procedure of pouring in an excess of the lacquer and pouring out the excess. By suitable changes in the amount and kind of diluent, these coating compositions may be applied with a spray gun, by brush, or by other well known means.

Acid esters similar to the above, but varying in consistency, solubility and stability against embrittlement with aging, may be produced by varying the proportions of castor oil to acids, by varying the rate of heating in the formation of the esters by varying the completeness of esterification as shown by the acid numbers, and by using castor oil of different stages of "blowing." The castor oil proportion may vary from two of blown castor oil to one to four of acids. It is also possible to substitute for portions of the citric acid, one or more of the dibasic non-hydroxy acids such as oxalic, malonic, succinic, glutaric, adipic or sebacic, in order to get softer resins, and in some cases to reduce the costs, without seriously effecting the properties imparted to the coating compositions and their films. Where the hydrocarbon insolubility is not an important characteristic desired in the lacquer, other partial resins of my invention may be used which do not have this property in so great a degree as the preferred resins given above.

The acid ester resins above described may be used in place of all or part of the other resins and plasticizers which are commonly used to vary the properties of cellulose type lacquers.

While I have described my invention by means of several illustrative compositions, I do not wish to be restricted to the particular mixtures given, but limit my invention only insofar as required by the state of the prior art, and the spirit of the appended claims.

Reference is made to my copending application Serial No. 437,022 filed March 31, 1942, in which is disclosed and claimed the plastic resinous composition forming the acid ester component of the protective coating compositions herein described and claimed.

I claim:

1. A protective coating composition comprising a lacquer-making cellulose derivative selected from the group consisting of cellulose esters and cellulose ethers and an acid ester comprising the product of the partial esterification of hydroxylated fatty oil with a hydroxy polybasic aliphatic carboxylic acid having from 3 to 7 carbon atoms, the acid number of said acid ester being about 230.

2. A protective coating composition comprising a lacquer-making cellulose derivative selected from the group consisting of cellulose esters and cellulose ethers and an acid ester comprising the product of the partial esterification of hydroxylated fatty oil with an aliphatic acid selected from the group consisting of citric acid, malic acid, and tartaric acid, the acid number of said acid ester being about 230.

3. A protective coating composition comprising a lacquer-making cellulose derivative selected from the group consisting of cellulose esters and cellulose ethers and an acid ester comprising the product of the partial esterification of hydroxylated fatty oil with citric acid, the acid number of said acid ester being about 230.

4. A protective coating composition comprising a lacquer-making cellulose derivative selected from the group consisting of cellulose esters and cellulose ethers and an acid ester comprising the product of the partial esterification of hydroxylated fatty oil with malic acid, the acid number of said acid ester being about 230.

5. A protective coating composition comprising a lacquer-making cellulose derivative selected from the group consisting of cellulose esters and cellulose ethers, and an acid ester comprising the product of the partial esterification of blown castor oil with an acid selected from the group consisting of citric acid, malic acid, and tartaric acid, the acid number of said acid ester being about 230.

6. A protective coating composition comprising a lacquer-making cellulose derivative selected from the group consisting of cellulose esters and cellulose ethers, and an acid ester comprising the product of the partial esterification of blown castor oil and citric acid, the said number of said acid ester being about 230.

7. A protective coating composition comprising a lacquer-making cellulose derivative selected from the group consisting of cellulose esters and cellulose ethers, and an acid ester comprising the product of the partial esterification of blown castor oil and malic acid, the acid number of said acid ester being about 230.

8. A protective coating composition comprising a lacquer-making cellulose derivative selected from the group consisting of cellulose esters and cellulose ethers, and an acid ester comprising the product of the partial esterification of two parts blown castor oil with one to four parts of citric acid, the acid number of said acid ester being about 230.

9. A protective coating composition comprising a lacquer-making cellulose derivative selected from the group consisting of cellulose esters and cellulose ethers, and an acid ester comprising the product of the partial esterification of an hydroxylated fatty oil, a hydroxy polybasic aliphatic carboxylic acid, and an aliphatic hydroxy monocarboxylic acid, the acid number of said acid ester being about 230.

10. A protective coating composition comprising a lacquer-making cellulose derivative selected from the group consisting of cellulose esters and cellulose ethers, and an acid ester comprising the product of the partial esterification of castor oil, an aliphatic hydroxy polybasic aliphatic carboxylic acid, and a hydroxy monocarboxylic acid, the acid number of said acid ester being about 230.

11. A protective coating composition comprising a lacquer-making cellulose derivative selected from the group consisting of cellulose esters and cellulose ethers, and an acid ester comprising the product of the partial esterification of blown castor oil, a hydroxy polybasic aliphatic carboxylic acid, and an aliphatic hydroxy monocarboxylic acid, the acid number of said acid ester being about 230.

12. A protective coating composition comprising a lacquer-making cellulose derivative selected from the group consisting of cellulose esters and cellulose ethers, and an acid ester comprising the product of the partial esterification of blown linseed oil, a hydroxy polybasic aliphatic carboxylic acid, and an aliphatic hydroxy monocorboxylic acid, the acid number of said acid ester being about 230.

13. A protective coating composition comprising a lacquer-making cellulose derivative selected from the group consisting of cellulose esters and cellulose ethers, and an acid ester comprising the product of the partial esterification of castor oil; an acid selected from the group consisting of citric acid, malic acid, and tartaric acid; and a hydroxy monobasic aliphatic carboxylic acid, the acid number of said acid ester being about 230.

14. A protective coating composition comprising a lacquer-making cellulose derivative selected from the group consisting of cellulose esters and cellulose ethers, and an acid ester comprising the product of the partial esterification of blown castor oil; an acid selected from the group consisting of citric acid, malic acid, and tartaric acid; and a hydroxy monobasic aliphatic carboxylic acid, the acid number of said acid ester being about 230.

15. A protective coating composition comprising a lacquer-making cellulose derivative selected from the group consisting of cellulose esters and cellulose ethers, and an acid ester comprising the product of the partial esterification of blown linseed oil; an acid selected from the group consisting of citric acid, malic acid, and tartaric acid; and a hydroxy monobasic aliphatic carboxylic acid, the acid number of said acid ester being about 230.

16. A protective coating composition comprising a lacquer-making cellulose derivative selected from the group consisting of cellulose esters and cellulose ethers, and an acid ester comprising the product of the partial esterification of an hydroxylated fatty oil; an aliphatic acid selected from the group consisting of citric acid, malic acid, and tartaric acid; and lactic acid, the acid number of said acid ester being about 230.

17. A protective coating composition comprising a lacquer-making cellulose derivative selected from the group consisting of cellulose esters and cellulose ethers, and an acid ester comprising the product of the partial esterification of blown castor oil; an aliphatic acid selected from the group consisting of citric acid, malic acid, and tartaric acid; and lactic acid, the acid number of said acid ester being about 230.

18. A protective coating composition comprising a lacquer-making cellulose derivative selected from the group consisting of cellulose esters and cellulose ethers, and an acid ester comprising the product of the partial esterification of blown linseed oil; an aliphatic acid selected from the group consisting of citric acid, malic acid, and tartaric acid; and lactic acid, the acid number of said acid ester being about 230.

19. A protective coating composition comprising a lacquer-making cellulose derivative selected from the group consisting of cellulose esters and cellulose ethers, and an acid ester comprising the product of the partial esterification of an hydroxylated fatty oil; an aliphatic acid selected from the group consisting of citric acid, malic acid, and tartaric acid; and a dibasic (non-hydroxy) aliphatic acid selected from the group consisting of oxalic acid, malonic acid, succinic acid, glutaric acid, adipic acid, and sebacic acid, the acid number of said acid ester being about 230.

20. A protective coating composition comprising a lacquer-making cellulose derivative selected from the group consisting of cellulose esters and cellulose ethers, and an acid ester comprising the product of the partial esterification of an hydroxylated fatty oil; a hydroxy polybasic aliphatic carboxylic acid; a hydroxy monobasic aliphatic carboxylic acid; and a dicarboxylic (non-hydroxy) aliphatic acid, the acid number of said acid ester being about 230.

EDWARD A. LASHER.